United States Patent [19]

Grobler

[11] 4,362,055
[45] Dec. 7, 1982

[54] POWER TRANSMISSION PART TESTING APPARATUS

[75] Inventor: Werner H. Grobler, Stuttgart, Fed. Rep. of Germany

[73] Assignee: Deere & Company, Moline, Ill.

[21] Appl. No.: 228,423

[22] Filed: Jan. 26, 1981

[30] Foreign Application Priority Data

May 29, 1980 [DE] Fed. Rep. of Germany ....... 3020391

[51] Int. Cl.³ .......................................... G01M 13/02
[52] U.S. Cl. .................................................. 73/162
[58] Field of Search ............................. 73/162, 432 R

[56] References Cited
U.S. PATENT DOCUMENTS 4,274,278 6/1981 Patterson .............................. 73/162

OTHER PUBLICATIONS

"Recent Developments in Product Testing", John Beal, Minneapolis, Minn.
"Fundamentals of Service Hydraulics", pp. 4-6, Deere & Co., 1967, (Vane-Type Cylinders).

Primary Examiner—S. Clement Swisher

[57] ABSTRACT

A test apparatus applies torque to rotating parts to be tested. A drive motor rotates a first shaft. A first coupling connects the first shaft with an input of the part to be tested. The second coupling connects an output of the part to be tested with an input member of a torque generating hydraulic motor. An output member of the hydraulic motor is non-rotatably coupled to the first shaft. The input member may rotate through more than 360° relative to the output member. Pressure in the hydraulic motor may be varied to control the amount of torque applied to the parts to be tested.

7 Claims, 1 Drawing Figure

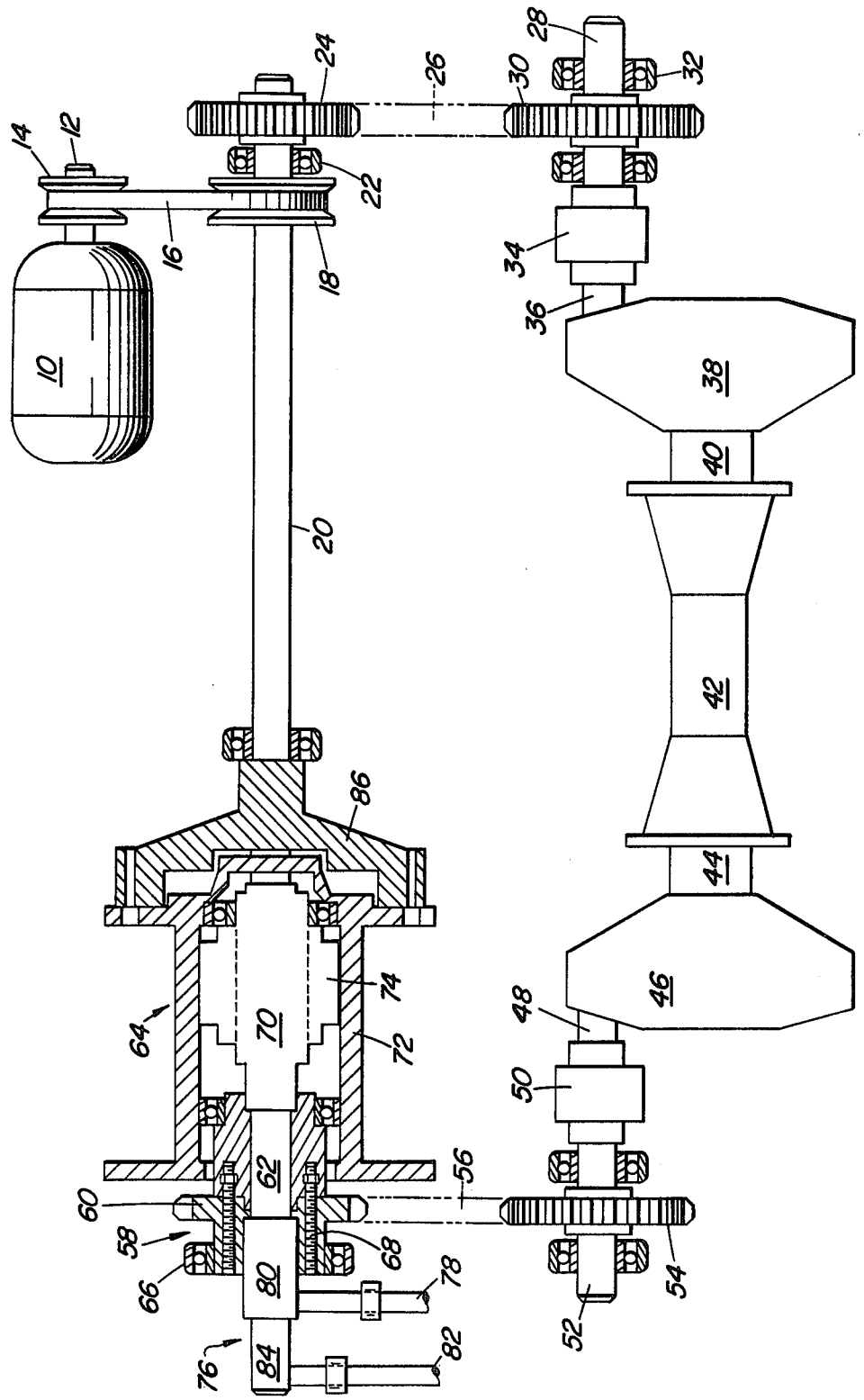

POWER TRANSMISSION PART TESTING APPARATUS

BACKGROUND OF THE INVENTION

The invention relates to an apparatus for testing parts for the transmission of power or the absorption of power.

A test stand is already known (documentation issued by MTS Systems Corporation, Minneapolis, USA, "Recent Developments in Product Testing", page 12) which operates on the energy circulation principle and which comprises two shafts which extend parallel to each other and which are drivingly connected to each other and which can be driven by way of a drive motor. Disposed in one shaft of the test stand is a hydraulic bracing element which is in the form of a rotary vane actuator whose input member is rotatable relative to the output member, through an angle of up to about 350°. A test stand of this kind cannot be used for parts which have, in total, a degree of twisting of more than 350°. In particular, it is not possible to compensate for slippage with a test stand of this kind (see documentation issued by Carl Schneck AG, Darmstadt, "Das Hydropuls-System", ("The Hydraulic Pulse System"), page 21. It would be desirable to provide a testing apparatus so designed and arranged that a high degree of slippage and/or twisting can be compensated within the apparatus.

SUMMARY OF THE INVENTION

Accordingly, the instant invention provides a test apparatus having a drive motor which is drivingly connected by way of a belt and pulley to a first shaft. A first chain coupling having a first transmission ratio drivingly connects the first shaft to the first part of a second shaft. The first part of the second shaft drives parts to be tested, such as first and second transmission interconnected by a cardan shaft. The second transmission is drivingly connected to the second part of the second shaft. The second part of the second shaft drives an input member of a bracing or torque generating device which consists of an axial piston hydraulic motor via a second chain coupling having a second transmission ratio. The output member of the hydraulic motor is rigidly connected to the first shaft.

An advantage of the present invention is that the input member of the bracing or torque generating device is rotatable through more than 360° relative to its output member. Thus, in this way, when slip occurs, and in particular also in the event of elongation of the drive elements, for example, the belts or chains, the necessary bracing or resistance to relative rotation of the input member relative to the output member can be maintained. For this purpose, it is advantageous for the bracing device to be in the form of a motor which also rotates. It is also advantageous for the bracing device to be formed as a hydraulic motor with an axial pressure fluid feed. The use of a hydraulic motor with axial pressure fluid feed permits the bracing device to be of a very compact design, while having a high level of operational efficiency.

In accordance with a further feature of the invention, it is advantageous that the transmission ratio of the first coupling can be different from the transmission ratio of the second coupling. In this way, the hydraulic motor can operate in the range of rotational speed in which the torque is stable, so that fluctuations in torque are reduced to a very small range.

It is also advantageous for the hydraulic motor to be integrated in one shaft and for the parts to be tested to be integrated in the other shaft. It is also advantageous for the hydraulic motor to have an input member with a speed of rotation which is higher or lower than that of the output member. This arrangement further ensures that the whole hydraulic motor can also rotate and can therefore be directly incorporated in an axially aligned manner into one of the shafts.

It is also advantageous for two parts to be tested, which are connected by way of drive elements, to be integrated into the second shaft. In this way, a plurality of parts can be readily tested in a shorter period of time. In addition, by virtue of this arrangement, the input speed of rotation, the input torque and the direction of input rotation of the first part of the second shaft are identical in relation to the second part of the second shaft. It is also advantageous for the bracing moment or torque to be steplessly variable during operation.

BRIEF DESCRIPTION OF THE DRAWING

An embodiment of an apparatus for testing parts for the transmission of power according to the invention is illustrated in the drawing.

DETAILED DESCRIPTION

In the drawing, reference numeral 10 denotes a drive motor which can be, for example, in the form of an electric motor and which on its output shaft 12 has a drive pulley 14 which is drivingly connected by way of a belt 16 to a drive pulley 18 which is non-rotatably arranged on a first shaft 20. The first shaft 20 is mounted in a plurality of coaxially aligned bearings 22. Disposed in the region of the right-hand end of the first shaft 20 is a driven chain wheel 24 which is drivingly connected by way of a chain 26 to a drive chain wheel 30 which is non-rotatably disposed on a first part 28 of a second shaft. Chain wheels 24 and 30 and drive chain 26 comprise a first drive coupling with a first transmission ratio determined by the ratio of the diameters of chain wheels 24 and 30. The first part 28 of the second shaft is also mounted in bearings 32. The first part 28 of the second shaft is drivingly connected by way of a clutch or coupling means, for example, a chain coupling means 34, to an input pinion 36 of a first part to be tested, such as a first transmission 38.

The first transmission 38 has a driven member 40 which is drivingly connected by way of a drive or cardan shaft 42 to a driven member 48 of a second part to be tested, such as a second transmission 46, while the driven member 48 thereof is drivingly connected by way of a chain clutch or coupling means 50 to a second part 52 of the second shaft upon which is mounted a chain wheel 54. In this manner, the first and second transmissions 38 and 46 are integrated into the second shaft between the first and second parts 28 and 52 of the second shaft. The second transmission 46 is therefore connected by its member 44 to the shaft 42 in order to produce the same speed of rotation and the same direction of rotation, as at the chain wheel 30.

The chain wheel 54 is drivingly connected by way of a chain 56 to an input member 58 which comprises a drive member, for example, a chain wheel 60, and an input shaft 62 of a hydraulic motor 64 which can be, for example, in the form of an axial piston motor. The chain wheels 54 and 60 and the chain 56 comprise a second drive coupling with a second transmission ratio determined by the ratio of the diameters of wheels 54 and 60. The second transmission ratio may be larger or smaller than the first transmission ratio of the first drive coupling. The input member 58 is mounted rotatably in a rolling bearing 66 which is carried by a mounting (not shown in the drawing). The chain wheel 60 is drivingly connected by way of connecting bolts or pins 68 and input shaft 62 to a hydraulic motor unit 70 which is only diagrammatically shown in the drawing and which has the individual hydraulic components for drive of the hydraulic motor 64. The hydraulic motor 64 has a driven or output member 74 and which is non-rotatably connected to the housing 72 of the hydraulic motor 64. In this way, when the hydraulic motor unit 70 is subjected to the action of pressure fluid, the driven member 74 can rotate, with the hydraulic motor unit 70, synchronously or at a different speed of rotation. Pressure fluid is supplied to the hydraulic motor unit 70 centrally by way of a hydraulic tandem through-feed means 76, for which purpose a pressure fluid conduit 78 is connected to an outer member 80 of the rotary feed means and a pressure fluid discharge conduit 82 is connected to the inner member 84 of the rotary feed means 76. The hydraulic motor 64, therefore, represents a drive connection between the input shaft 62 and the first shaft 20, with the entire housing 72 of the hydraulic motor 64 rotating synchronously with and integrated with the shaft 20. For this purpose, the housing 72 of the hydraulic motor 64 is non-rotatably connected to the first shaft 20 by way of a flange 86.

MODE OF OPERATION

This test stand operates on the energy circulation principle as only the frictional power loss, through the drive motor 10, and the pressure fluid supply into hydraulic motor 64 have to be fed into the apparatus. In particular, the drive motor 10 rotates the first and second shafts 20 and 28, the first and second transmissions 38 and 46, the hydraulic motor housing 72 and the chain wheel 54 all at desired rotational speeds. Because the first transmission ratio of the chain wheels 24 and 30 is different from the second transmission ratio of chain wheels 54 and 60, the hydraulic motor input member 62 rotates at a different speed than its output member 74 and housing 72. By varying the fluid pressure in lines 78 and 82, the resistance of hydraulic motor 64 to the relative rotation of its input and output members 62 and 74 may be controlled. In this manner, the amount of torque applied to the parts to be tested (first and second transmissions 38 and 46) may be controlled while the entire test apparatus rotates. Furthermore, the amount of torque may be controlled even if the input and output members 62 and 74 of hydraulic motor have a relative rotation therebetween of greater than 360°. Finally, the torque may be steplessly varied by steplessly varying the pressure applied through lines 78 and 82.

I claim:

1. An apparatus for testing parts for the transmission and absorption of power, comprising:
   a drive motor;
   a part to be tested having an input drivingly coupled to the drive motor and having an output; and
   torque generating means for applying a torque to the part to be tested, the torque generating means having an input member drivingly coupled to the output of the part to be tested and having an output member drivingly coupled to the drive motor, the input member being rotatable through more than 360 degrees relative to the output member, the torque generating means comprising a rotatable hydraulic motor.

2. The test apparatus of claim 1, wherein the hydraulic motor has an axial pressure fluid feed.

3. The test apparatus of claim 1 wherein:
   the input of the part to be tested is coupled to the drive motor via a first coupling having a first transmission ratio; and
   the output of the part to be tested is coupled to the input member of the torque generating means via a second coupling having a second tranmission ratio, the second transmission ratio being different from the first transmission ratio.

4. The test apparatus of claim 1, further comprising:
   a first shaft coupled between the drive motor and the output member of the torque generating means; and
   a second shaft having a first part drivingly coupled between the first shaft and the input of the part to be tested and having a second part drivingly coupled between the output of the part to be tested and the input member of the torque generating means.

5. The test apparatus of claim 1, wherein the input member of the torque generating means has a rotational speed which differs from the rotational speed of the output member.

6. The test apparatus of claim 1 or claim 5, wherein the part to be tested comprises a plurality of transmissions drivingly coupled together.

7. The test apparatus of claim 1, further comprising means for steplessly varying the torque generated by the torque generating means.

* * * * *